(12) United States Patent
Chakkera et al.

(10) Patent No.: US 9,488,130 B2
(45) Date of Patent: Nov. 8, 2016

(54) VARIABLE AREA FAN NOZZLE SYSTEMS WITH IMPROVED DRIVE COUPLINGS

(71) Applicant: HONEYWELL INTERNATIONAL INC., Morristown, NJ (US)

(72) Inventors: Kevin K. Chakkera, Chandler, AZ (US); Ron Vaughan, Gilbert, AZ (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 472 days.

(21) Appl. No.: 14/056,526

(22) Filed: Oct. 17, 2013

(65) Prior Publication Data

US 2015/0107220 A1    Apr. 23, 2015

(51) Int. Cl.
| | |
|---|---|
| *F02C 1/00* | (2006.01) |
| *F02K 1/72* | (2006.01) |
| *F16D 3/06* | (2006.01) |
| *F02K 1/80* | (2006.01) |
| *F02K 1/76* | (2006.01) |
| *F02K 3/06* | (2006.01) |

(Continued)

(52) U.S. Cl.
CPC . *F02K 1/72* (2013.01); *F02K 1/06* (2013.01); *F02K 1/763* (2013.01); *F02K 1/805* (2013.01); *F02K 3/06* (2013.01); *F16D 3/06* (2013.01); *F16D 3/2052* (2013.01); *F02K 1/08* (2013.01); *F02K 1/09* (2013.01); *F05D 2260/4031* (2013.01); *F05D 2270/44* (2013.01); *F05D 2270/66* (2013.01); *Y02T 50/671* (2013.01)

(58) Field of Classification Search
CPC ............... F02K 1/06; F02K 1/08; F02K 1/09
USPC .......................................................... 464/78
See application file for complete search history.

(56) References Cited

U.S. PATENT DOCUMENTS

| | | |
|---|---|---|
| 2,901,910 A | 9/1959 | Wandell et al. |
| 3,080,709 A | 3/1963 | Rand |

(Continued)

FOREIGN PATENT DOCUMENTS

| | | |
|---|---|---|
| EP | 1918562 A2 | 5/2008 |
| EP | 1978231 A2 | 10/2008 |

(Continued)

OTHER PUBLICATIONS

Chakkera, K. K. et al.; Vafn Systems with Improved Drive Coupling Assemblies and Brakes, filed Mar. 21, 2012 and assigned U.S. Appl. No. 13/426,291.

(Continued)

*Primary Examiner* — Gerald L Sung
(74) *Attorney, Agent, or Firm* — Lorenz & Kopf, LLP

(57) ABSTRACT

A VAFN system is provided for a fan case of an engine. The system includes a motor; a gearbox; an actuator; a nozzle; and a drive coupling extending between the gearbox and the actuator and configured to transmit the mechanical torque from the motor to the actuator. The drive coupling includes an external tube extending from a first one of the gearbox or the actuator, the external tube defining first and second slots extending in a longitudinal direction, and an internal tube extending from a second one of the gearbox or the actuator and at least partially extending within the external tube, the internal tube including a pin with first and second ends respectively positioned within the first and second slots such that the internal tube is configured to translate within the external tube and to be rotatably coupled to the external tube.

18 Claims, 10 Drawing Sheets

(51) Int. Cl.
*F02K 1/06* (2006.01)
*F16D 3/205* (2006.01)
*F02K 1/08* (2006.01)
*F02K 1/09* (2006.01)

(56) References Cited

U.S. PATENT DOCUMENTS

| | | | |
|---|---|---|---|
| 3,289,411 A | 12/1966 | Rogers et al. | |
| 3,332,234 A | 7/1967 | Lavash | |
| 3,442,218 A | 5/1969 | Weiss | |
| 3,696,895 A | 10/1972 | Schaffer et al. | |
| 3,829,020 A | 8/1974 | Stearns | |
| 3,865,508 A | 2/1975 | Nagler | |
| 3,877,663 A | 4/1975 | Curran et al. | |
| 4,383,647 A | 5/1983 | Woodruff et al. | |
| 4,411,399 A | 10/1983 | Hapke | |
| 4,505,108 A | 3/1985 | Woodruff et al. | |
| 4,552,309 A | 11/1985 | Szuminski et al. | |
| 4,579,039 A | 4/1986 | Ebbing | |
| 4,646,860 A | 3/1987 | Owens et al. | |
| 4,813,607 A | 3/1989 | Hill et al. | |
| 4,821,979 A | 4/1989 | Denning et al. | |
| 4,922,713 A | 5/1990 | Barbarin et al. | |
| 5,199,643 A | 4/1993 | Rozmus | |
| 5,211,008 A | 5/1993 | Fage | |
| 5,277,020 A | 1/1994 | Dehu et al. | |
| 5,280,704 A | 1/1994 | Anderson et al. | |
| 5,359,848 A | 11/1994 | Davies | |
| 5,655,360 A | 8/1997 | Butler | |
| 5,778,659 A | 7/1998 | Duesler et al. | |
| 5,782,432 A | 7/1998 | Renshaw | |
| 5,794,850 A | 8/1998 | Gutierrez, Jr. | |
| 5,806,302 A | 9/1998 | Cariola et al. | |
| 5,960,626 A | 10/1999 | Baudu et al. | |
| 5,996,937 A | 12/1999 | Gonidec et al. | |
| 6,000,216 A | 12/1999 | Vauchel | |
| 6,070,407 A | 6/2000 | Newton | |
| 6,142,416 A | 11/2000 | Markstein et al. | |
| 6,286,784 B1 | 9/2001 | Hardy et al. | |
| 6,293,495 B1 | 9/2001 | Aten et al. | |
| 6,318,070 B1 | 11/2001 | Rey et al. | |
| 6,487,847 B1 | 12/2002 | Snow et al. | |
| 6,526,744 B2 | 3/2003 | Ahrendt | |
| 6,543,224 B1 | 4/2003 | Barooah | |
| 6,546,716 B2 | 4/2003 | Lair | |
| 6,584,762 B2 | 7/2003 | Snow et al. | |
| 6,584,763 B2 | 7/2003 | Lymons et al. | |
| 6,625,973 B1 | 9/2003 | Langford et al. | |
| 6,637,199 B2 | 10/2003 | Spickard | |
| 6,935,097 B2 | 8/2005 | Eschborn | |
| 6,974,107 B2 | 12/2005 | Christensen | |
| 6,983,588 B2 | 1/2006 | Lair | |
| 7,093,793 B2 | 8/2006 | Lair | |
| 7,127,880 B2 | 10/2006 | Lair et al. | |
| 7,216,831 B2 | 5/2007 | Wood | |
| 7,355,300 B2 | 4/2008 | Wilmot et al. | |
| 7,458,221 B1 | 12/2008 | Arnold et al. | |
| 7,482,709 B2 | 1/2009 | Berenger | |
| 7,493,752 B2 | 2/2009 | Horswill et al. | |
| 7,587,899 B2 | 9/2009 | Song et al. | |
| 7,637,095 B2 | 12/2009 | Winter et al. | |
| 7,690,205 B2 | 4/2010 | Delaloye et al. | |
| 7,721,549 B2 | 5/2010 | Baran | |
| 7,919,938 B2 | 4/2011 | Harvey et al. | |
| 7,966,827 B2 | 6/2011 | Alletzhauser | |
| 7,966,828 B2 | 6/2011 | Cini et al. | |
| 8,074,440 B2 | 12/2011 | Kohlenberg et al. | |
| 8,402,743 B2 | 3/2013 | Nouhaud | |
| 8,733,080 B2 | 5/2014 | Jones et al. | |
| 8,978,356 B2 | 3/2015 | Burgess | |
| 9,057,343 B2 | 6/2015 | McKay | |
| 2004/0139727 A1 | 7/2004 | Horswill et al. | |
| 2005/0001095 A1 | 1/2005 | Christensen | |
| 2005/0086927 A1 | 4/2005 | Lair et al. | |
| 2008/0069687 A1 | 3/2008 | Lace | |
| 2008/0105074 A1 | 5/2008 | Bristol et al. | |
| 2008/0229851 A1 | 9/2008 | Jones et al. | |
| 2009/0013664 A1 | 1/2009 | Jones et al. | |
| 2009/0067993 A1 | 3/2009 | Roberge et al. | |
| 2009/0169366 A1 | 7/2009 | Petitjean et al. | |
| 2009/0188233 A1 | 7/2009 | Vauchel et al. | |
| 2009/0193789 A1 | 8/2009 | Pero | |
| 2009/0252600 A1 | 10/2009 | Winter et al. | |
| 2009/0260345 A1 | 10/2009 | Chaudhry | |
| 2009/0266912 A1 | 10/2009 | Gukeisen | |
| 2009/0288386 A1 | 11/2009 | Marshall et al. | |
| 2009/0288387 A1 | 11/2009 | Baltas | |
| 2009/0297338 A1 | 12/2009 | Lord et al. | |
| 2009/0320444 A1 | 12/2009 | Nouhaud | |
| 2009/0320937 A1 | 12/2009 | Arnett | |
| 2009/0326783 A1 | 12/2009 | Calmelat et al. | |
| 2010/0000220 A1 | 1/2010 | Chaudhry | |
| 2010/0008764 A1 | 1/2010 | Baltas | |
| 2010/0018213 A1 | 1/2010 | Migliaro | |
| 2010/0037588 A1 | 2/2010 | Baltas | |
| 2010/0043394 A1 | 2/2010 | Pero | |
| 2010/0050595 A1 | 3/2010 | Migliaro et al. | |
| 2010/0058769 A1 | 3/2010 | Baran | |
| 2010/0064659 A1 | 3/2010 | Wang | |
| 2010/0089029 A1 | 4/2010 | Somerfield et al. | |
| 2010/0107600 A1 | 5/2010 | Hillel et al. | |
| 2010/0115958 A1 | 5/2010 | Parham | |
| 2010/0126139 A1 | 5/2010 | Howe | |
| 2010/0139243 A1 | 6/2010 | Migliaro | |
| 2010/0146932 A1 | 6/2010 | Webster | |
| 2010/0170220 A1 | 7/2010 | Kohlenberg | |
| 2010/0180571 A1 | 7/2010 | Zysman et al. | |
| 2010/0218483 A1 | 9/2010 | Smith | |
| 2010/0229527 A1 | 9/2010 | Amkraut et al. | |
| 2010/0229528 A1 | 9/2010 | Ramlaoui et al. | |
| 2010/0257841 A1 | 10/2010 | Pero et al. | |
| 2010/0264676 A1 | 10/2010 | Sternberger et al. | |
| 2010/0300117 A1 | 12/2010 | Moulebhar | |
| 2010/0313546 A1 | 12/2010 | Kubiak | |
| 2011/0004388 A1 | 1/2011 | Winter | |
| 2011/0030380 A1 | 2/2011 | Widdle et al. | |
| 2011/0072780 A1 | 3/2011 | Somerfield et al. | |
| 2011/0120078 A1 | 5/2011 | Schwark et al. | |
| 2011/0120079 A1 | 5/2011 | Schwark et al. | |
| 2011/0120080 A1 | 5/2011 | Schwark, Jr. et al. | |
| 2011/0120081 A1 | 5/2011 | Schwark, Jr. et al. | |
| 2011/0192135 A1 | 8/2011 | McKay et al. | |
| 2011/0296813 A1 | 12/2011 | Frank et al. | |
| 2012/0031071 A1 | 2/2012 | Maalioune et al. | |
| 2012/0090311 A1 | 4/2012 | Le Coq et al. | |
| 2012/0137654 A1 | 6/2012 | Burgess | |
| 2012/0153085 A1 | 6/2012 | Good et al. | |
| 2013/0061572 A1 | 3/2013 | Le Coq | |

FOREIGN PATENT DOCUMENTS

| | | |
|---|---|---|
| EP | 2169269 A1 | 3/2010 |
| EP | 2239449 A2 | 10/2010 |
| FR | 2882097 A1 | 8/2006 |
| FR | 2944564 A1 | 10/2010 |
| GB | 1053453 | 1/1967 |
| GB | 2446441 A | 8/2008 |
| GB | 2446441 A1 | 8/2008 |
| GB | 2449281 A | 11/2008 |
| WO | 0194796 A1 | 12/2001 |
| WO | 2009029401 A2 | 3/2009 |
| WO | 2011004095 A1 | 1/2011 |
| WO | 2011131872 A1 | 10/2011 |

OTHER PUBLICATIONS

Vaughan, R. et al; Vafn Systems with Nozzle Locking Assemblies, filed Mar. 21, 2012 and assigned U.S. Appl. No. 13/426,275.

Vaughan, R. et al; Case Assembly with Fuel Driven Actuation Systems, filed Mar. 21, 2012 and assigned U.S. Appl. No. 13/426,256.

Vaughan, R. et al; Case Assemblies with Common Controls, filed Mar. 21, 2012 and assigned U.S. Appl. No. 13/426,240.

(56) References Cited

OTHER PUBLICATIONS

Vaughan, R. et al; Case Assembly with Fuel or Hydraulic Driven Vafn Actuation Systems, filed Mar. 21, 2012 and assigned U.S. Appl. No. 13/426,264.
USPTO Office Action, Notification dated Nov. 28, 2014 for U.S. Appl. No. 13/426,275.
USPTO Office Action, Notification Date Feb. 26, 2015; U.S. Appl. No. 13/426,240.
USPTO Office Action, Notification Date Feb. 27, 2015; U.S. Appl. No. 13/426,256.
EP Examination Report for Application No. 12194879.8 dated Sep. 22, 2014.
USPTO Office Action for U.S. Appl. No. 13/426,256; Notification date Sep. 21, 2015.

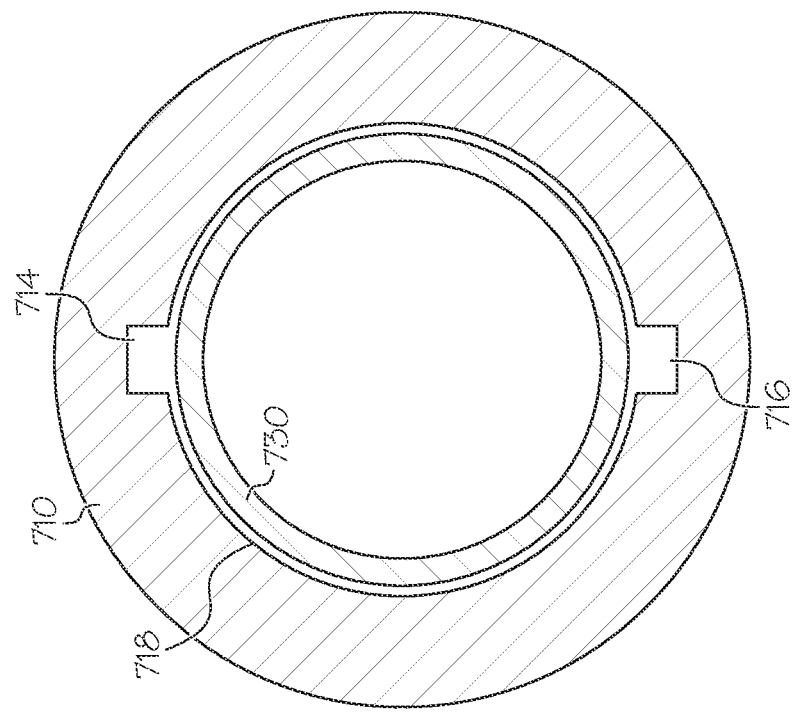
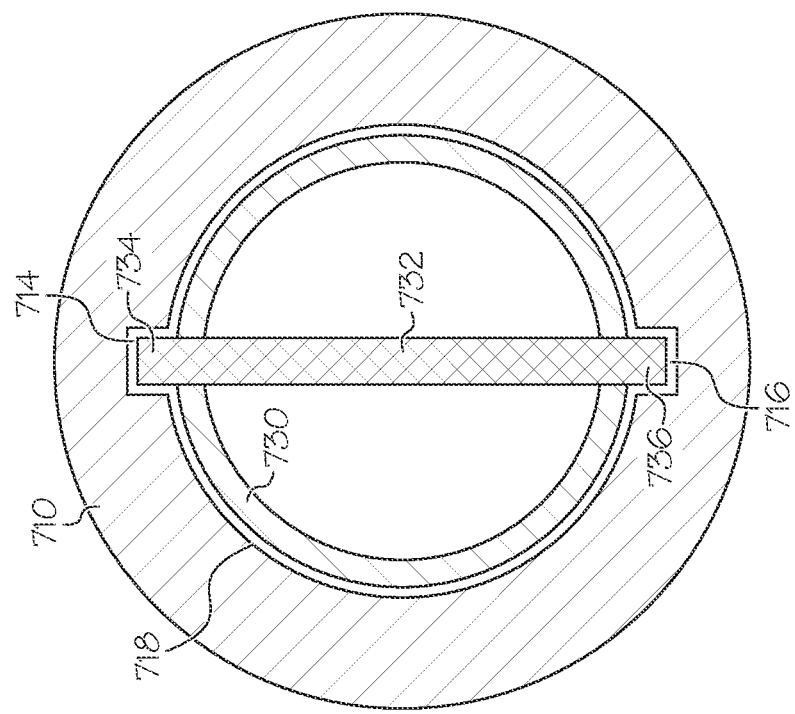

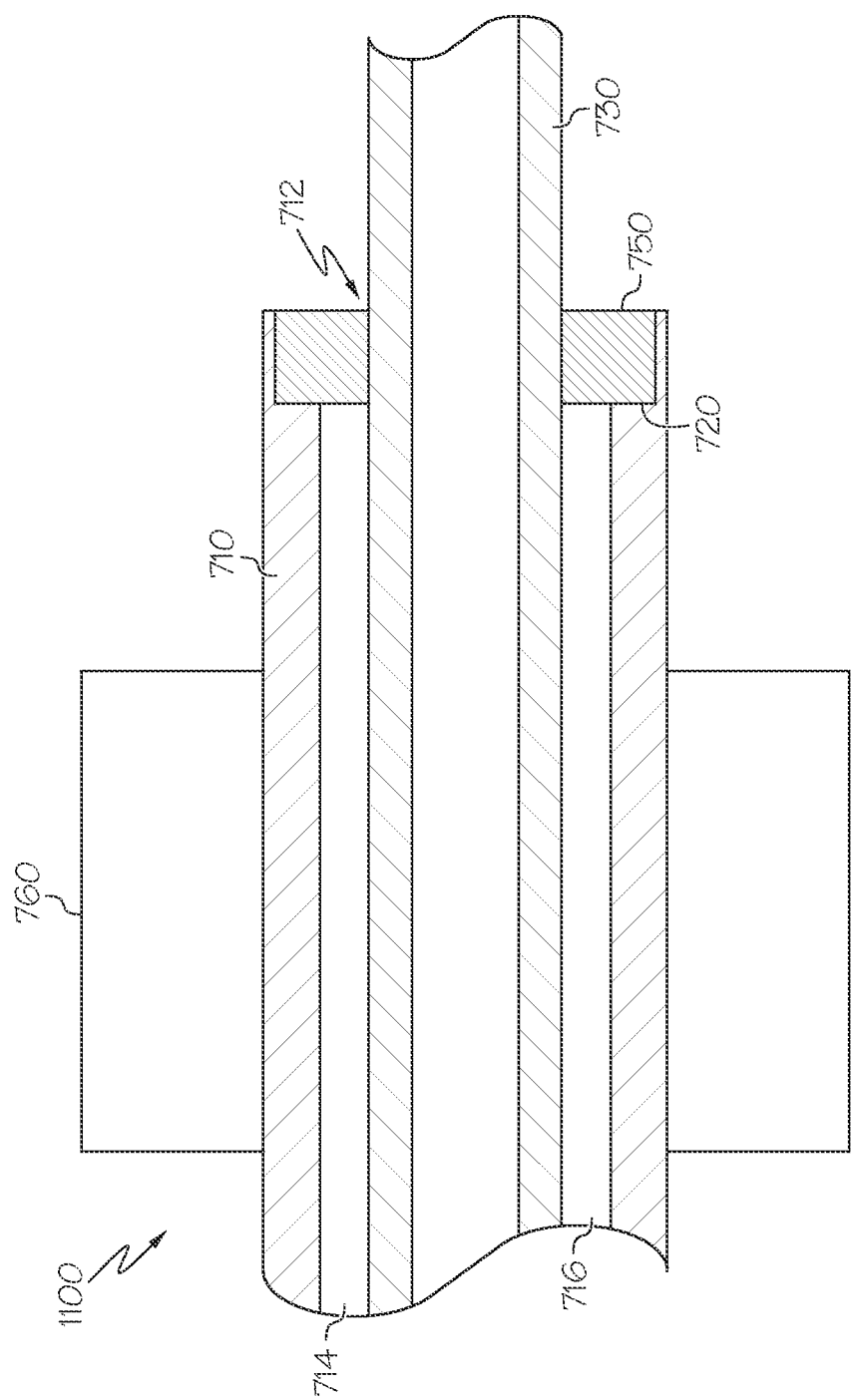

VARIABLE AREA FAN NOZZLE SYSTEMS WITH IMPROVED DRIVE COUPLINGS

TECHNICAL FIELD

The present invention relates to aircraft case assemblies, particularly case assemblies with aircraft thrust reverser actuation systems (TRAS) and aircraft variable area fan nozzle (VAFN) systems.

BACKGROUND

Conventional gas turbine engines generally include a fan section and a core engine with the fan section having a larger diameter than that of the core engine. The fan section and the core engine are disposed about a longitudinal axis and are enclosed within an engine nacelle or case assembly.

Combustion gases are discharged from the core engine through a core exhaust nozzle while an annular fan flow, disposed radially outward of the primary airflow path, is discharged through an annular fan exhaust nozzle system defined between a fan nacelle and a core nacelle. A majority of thrust is produced by the pressurized fan air discharged through the fan exhaust nozzle, the remaining thrust being provided from the combustion gases discharged through the core exhaust nozzle.

Some gas turbine engines include variable area fan nozzle (VAFN) systems to selectively provide a smaller fan exit nozzle diameter to optimize operation during certain conditions. Although potentially beneficial, existing VAFN systems typically utilize relatively complex mechanisms that undesirably increase overall engine weight and decrease fuel efficiency, particularly considering that portions of the VAFN system may be mounted on portions of the case assemblies with different relative movements. For example, portions of the VAFN system may be positioned on or adjacent to transcowls of a thrust reverser actuation system. When deployed, the transcowls of a thrust reverser actuation system function to redirect the rearward thrust of the jet engine to a forward or semi-forward direction to decelerate the aircraft upon landing, thereby enhancing the braking of the aircraft. However, as noted above, the resulting relative movement of portions of the VAFN system may complicate design and operation.

Accordingly, it is desirable to provide improved VAFN systems that, for example, reduce complexity, weight, and cost in a turbofan engine. Furthermore, other desirable features and characteristics of the present invention will become apparent from the subsequent detailed description of the invention and the appended claims, taken in conjunction with the accompanying drawings and this background of the invention.

BRIEF SUMMARY

In accordance with an exemplary embodiment, a variable area fan nozzle (VAFN) system is provided for a fan case of an engine. The system includes a motor configured to provide mechanical torque; a gearbox coupled to the motor to receive the mechanical torque from the motor; an actuator coupled to the gearbox to receive the mechanical torque from the gearbox; a nozzle coupled to the actuator and configured to be driven based on the mechanical torque; and a drive coupling extending between the gearbox and the actuator and configured to transmit the mechanical torque from the motor to the actuator. The drive coupling includes an external tube extending from a first one of the gearbox or the actuator, the external tube defining first and second slots extending in a longitudinal direction, and an internal tube extending from a second one of the gearbox or the actuator and at least partially extending within the external tube, the internal tube including a pin with first and second ends respectively positioned within the first and second slots such that the internal tube is configured to translate within the external tube and to be rotatably coupled to the external tube.

In accordance with another exemplary embodiment, a drive coupling extends between a gearbox and actuator of an aircraft variable area fan nozzle (VAFN) system. The drive coupling includes an external tube extending from the gearbox, the external tube defining first and second slots extending in a longitudinal direction; and an internal tube extending from the actuator and at least partially extending within the external tube, the internal tube including a pin with first and second ends respectively positioned within the first and second slots such that the internal tube is configured to translate within the external tube and to be rotatably coupled to the external tube.

In accordance with another exemplary embodiment, a case assembly for an aircraft is provided. The case assembly includes an engine system; an inner cowl circumscribing the engine system to form a core flow path; a fan case circumscribing the inner cowl to form a bypass flow path; a thrust reverser actuation system (TRAS) comprising a transcowl with a stowed position and a deployed position, the transcowl selectively blocking a portion of bypass flow path in the deployed position; and a variable area fan nozzle (VAFN) system. The VAFN system includes a motor configured to provide mechanical torque; an actuator coupled to the motor to receive the mechanical torque from the motor, wherein the actuator is mounted on the transcowl; a nozzle coupled to the actuator and configured to be driven based on the mechanical torque to selectively restrict the bypass flow path; and a drive coupling extending between the gearbox and the actuator and configured to transmit the mechanical torque from the motor to the actuator. The drive coupling includes an external tube coupled to a first one of the motor or the actuator, the external tube defining first and second slots extending in a longitudinal direction, and an internal tube coupled to a second one of the motor or the actuator and at least partially extending within the external tube, the internal tube including a pin with first and second ends respectively positioned within the first and second slots such that the internal tube is configured to translate within the external tube and to be rotatably coupled to the external tube.

BRIEF DESCRIPTION OF THE DRAWINGS

The present invention will hereinafter be described in conjunction with the following drawing figures, wherein like numerals denote like elements.

FIG. 9 is a cross-sectional view of the VAFN drive assembly through line 9-9 of FIG. 7 according to an exemplary embodiment;

FIG. 10 is a cross-sectional view of the VAFN drive assembly through line 10-10 of FIG. 7 according to an exemplary embodiment; and FIG. 11 is a second more detailed cross-sectional view of the VAFN drive assembly of FIG. 7 according to an exemplary embodiment.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Figure 1:
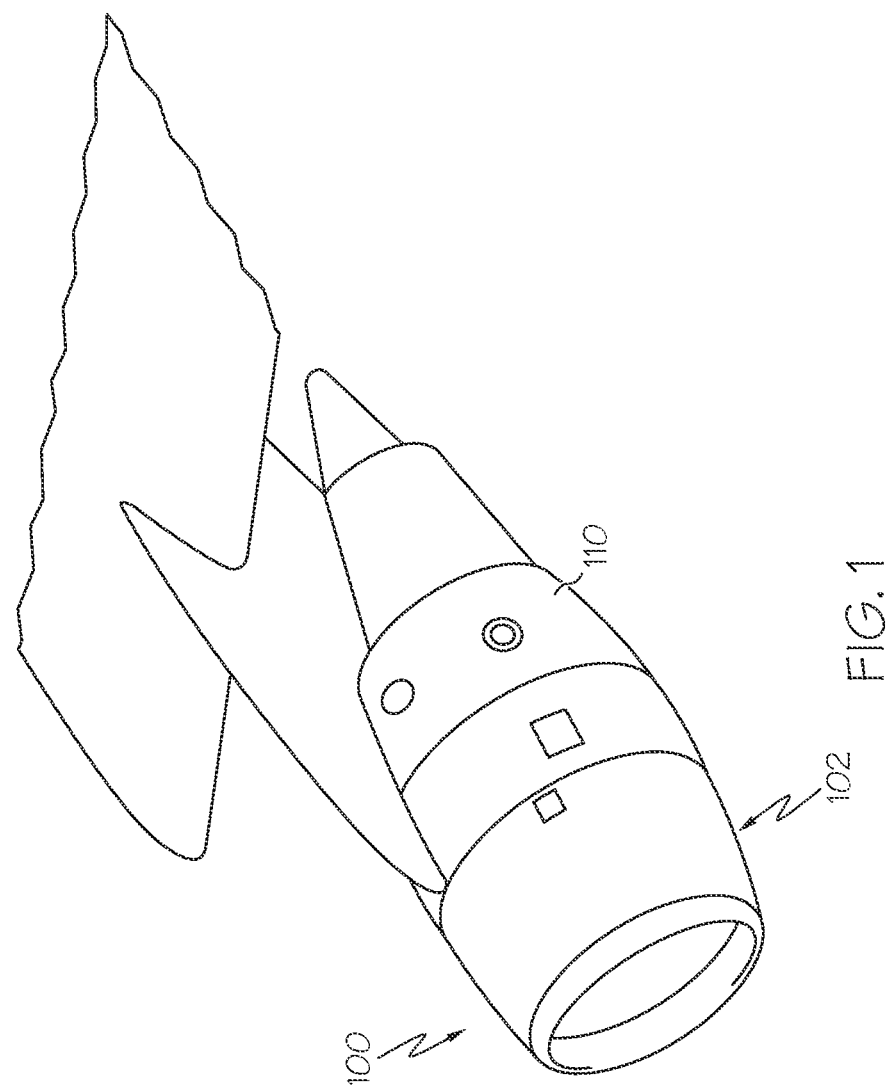
FIG. 1 is a perspective view of an aircraft engine system according to an exemplary embodiment.

FIG. 1 is a perspective view of portions of an aircraft jet engine system 100 with a fan case 102. Typically, the fan case 102 encloses a turbofan engine, as described below, and mounts the engine for aircraft operation. The engine system 100 may be mounted to a wing or fuselage of an aircraft, for example, by a pylon or other similar support. As also discussed below, the engine system 100 may include a case assembly 110 to optimize operation.

Figure 2:
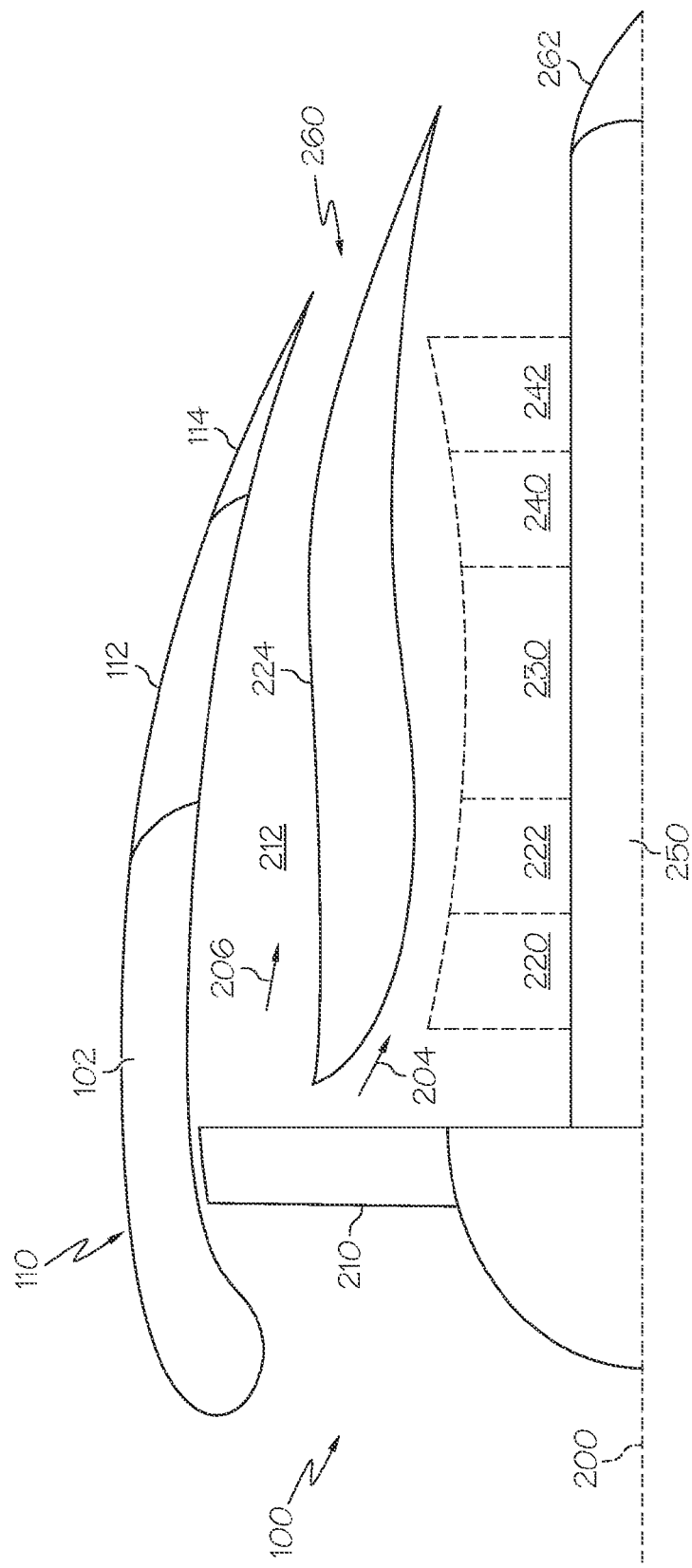
FIG. 2 is a schematic cross-sectional view of the engine system of FIG. 1 according to an exemplary embodiment.

FIG. 2 is a schematic cross-sectional view of the engine system 100 of FIG. 1. The engine system 100 is circumferentially disposed about an engine centerline 200. The engine system 100 includes a fan 210, a low pressure compressor 220, a high pressure compressor 222, a combustion section 230, a high pressure turbine 240, and a low pressure turbine 242 arranged around an engine shaft 250. Typically, air is compressed in the compressors 220, 222, mixed with fuel and burned in the combustion section 230, and expanded in the turbines 240, 242. The turbines 240, 242 include rotors coupled for rotation with the engine shaft to drive the compressors 220, 222 and the fan 210 in response to the expansion of combustion gases.

In the example shown, the engine system 100 is a gas turbine bypass turbofan arrangement in which the diameter of the fan 210 is larger than that of the compressors 220, 222. As such, the case (or nacelle) 102 extends circumferentially about the fan 210 to define a bypass air flow path 212 extending between the case 102 and an inner cowl 224, which generally surrounds the compressors 220, 222, combustion section 230, and turbines 240, 242.

During operation, the fan 210 draws air into the engine system 100 as core flow 204 and into the bypass air flow path 212 as bypass air flow 206. A rear exhaust 260 discharges the bypass air flow 206 from the engine system 100, and the core flow 204 is discharged from a passage between the inner cowl 224 and a tail cone 262 to produce thrust.

As described in greater detail below, the case assembly 110 generally includes a thrust reverser actuation system (TRAS) 112 and a variable area fan nozzle (VAFN) system 114 to manipulate bypass air flow 206 in the flow path 212. In general, the TRAS 112 functions to selectively block the bypass air flow path 212 of the engine to provide braking to the aircraft, e.g., as redirected thrust. The VAFN system 114 functions to selectively adjust the flow area of the bypass air flow path 212 to optimize engine operation.

Figure 3:
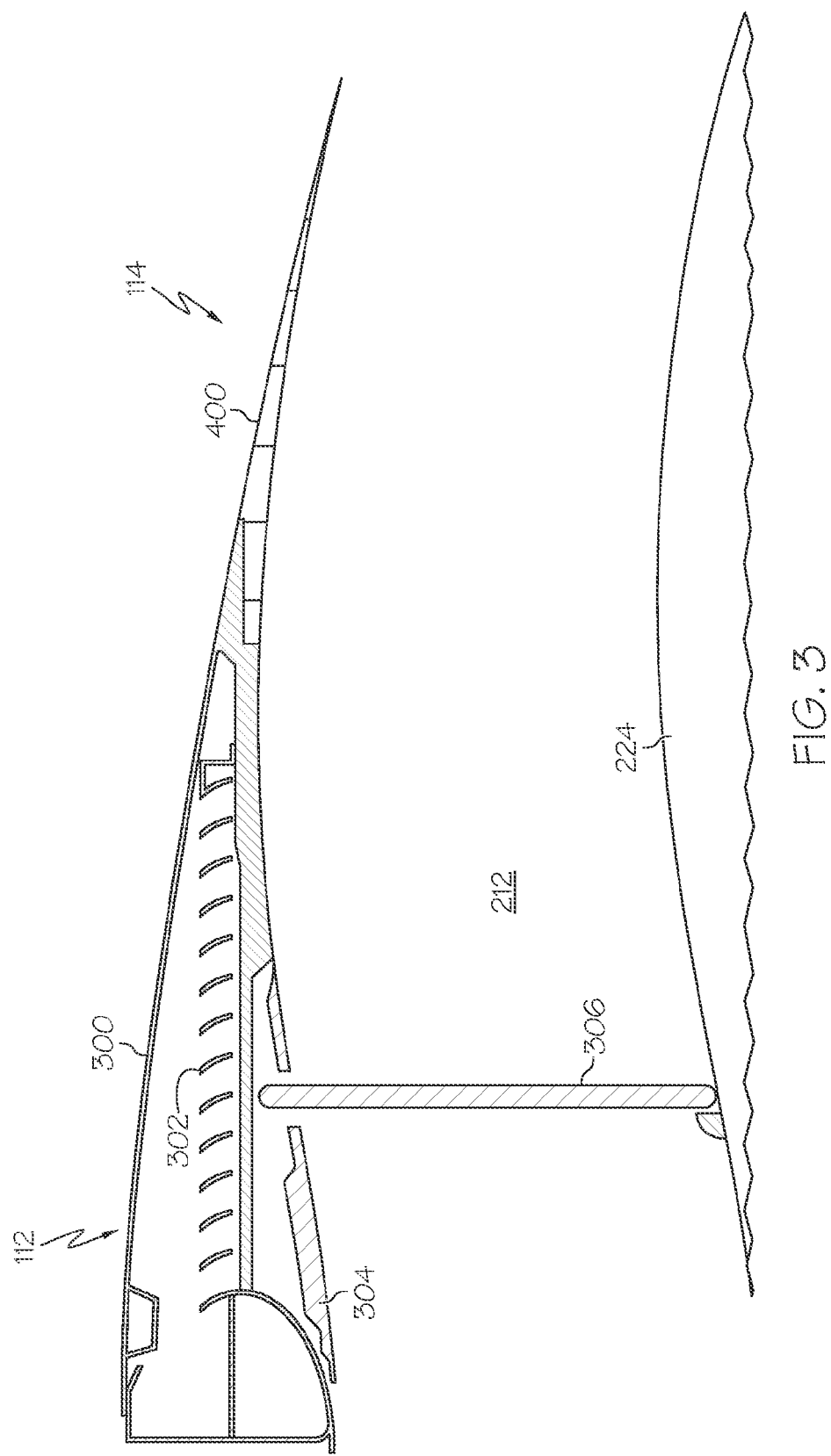
FIG. 3 is a partial, more detailed cross-sectional view of the engine system of FIG. 2 with a transcowl and nozzle in a first position according to an exemplary embodiment.
Figure 4:
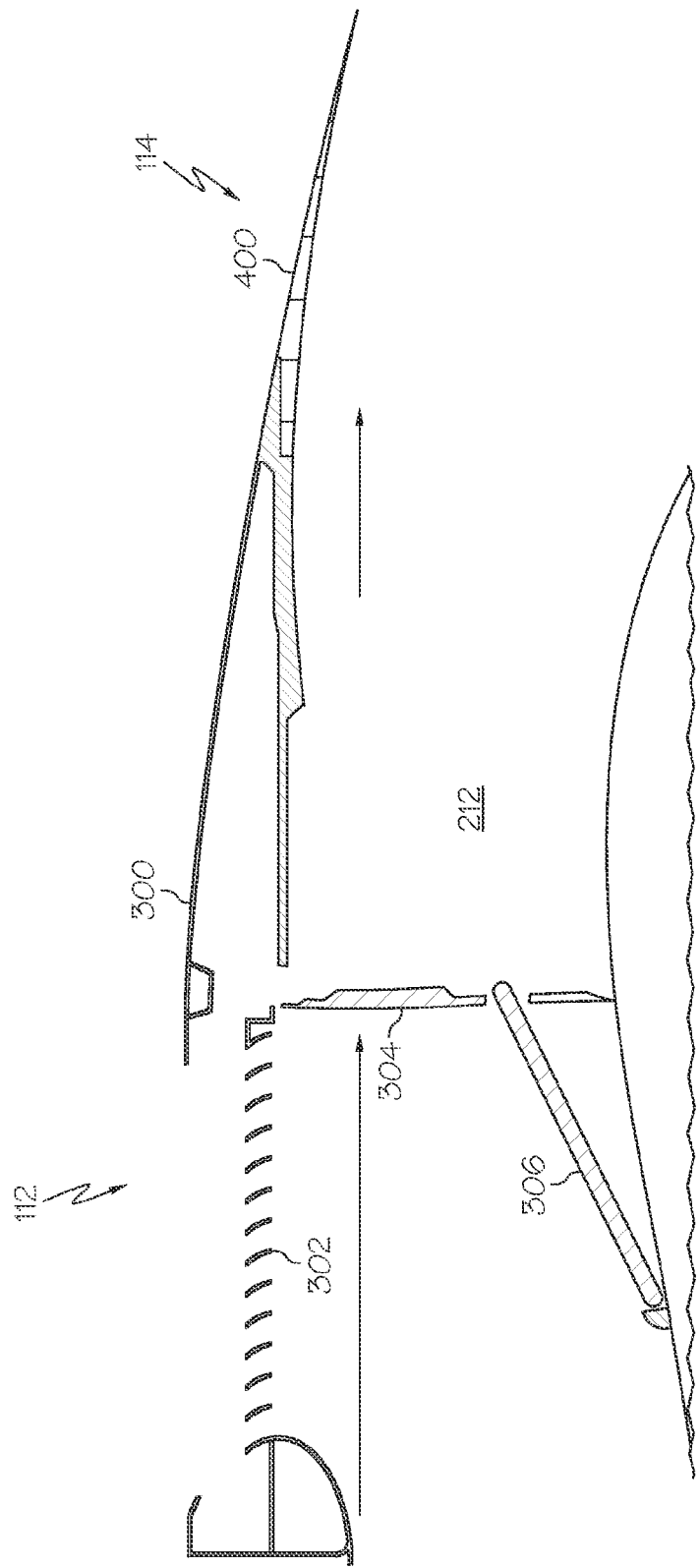
FIG. 4 is a partial, more detailed cross-sectional view of the engine system of FIG. 2 with a transcowl in a second position according to an exemplary embodiment.
Figure 5:
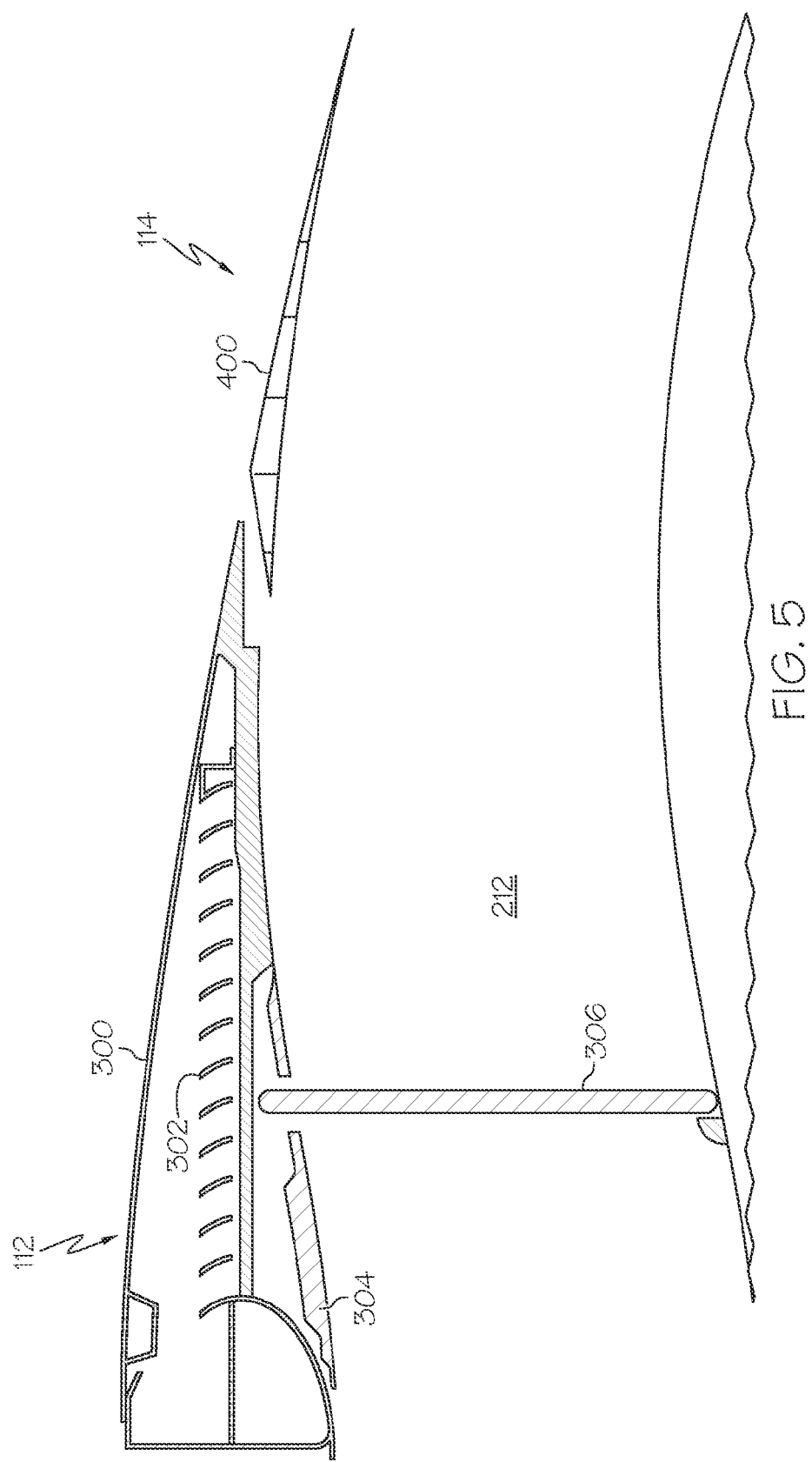
FIG. 5 is a partial, more detailed cross-sectional view of the engine system of FIG. 2 with a nozzle in a second position according to an exemplary embodiment.

FIGS. 3-5 illustrate the operation of the TRAS 112 and VAFN system 114 relative to the bypass air flow path 212. In particular, FIG. 3 is a partial, more detailed cross-sectional view of the aircraft engine of FIG. 2 with the TRAS 112 and VAFN system 114 in a first position. FIG. 4 is a partial, more detailed cross-sectional view of the aircraft engine of FIG. 2 with the TRAS 112 in a second position, and FIG. 5 is a partial, more detailed cross-sectional view of the aircraft engine of FIG. 2 with the VAFN system 114 in a second position.

As is described in greater detail below, the TRAS 112 includes one or more semi-circular transcowls (or "reverser cowls") 300 that are positioned circumferentially on the outside of the jet engine fan case 102 (FIG. 1), typically on a fixed structure or torque box. In one exemplary embodiment, the TRAS 112 includes a pair of semi-circular transcowls 300 that extend around the case 102. The VAFN system 114 includes trailing edge fan nozzles 400 arranged at the downstream ends of the transcowls 300. Additional details about the operation and deployment of the transcowls 300 and nozzles 400 will be provided below with respect to FIGS. 3-5 prior to a more detailed description of the actuation system for adjusting the transcowls 300 and nozzles 400.

As shown more particularly in FIG. 3, the transcowls 300 cover a plurality of vanes 302, which may be cascade-type vanes that are positioned between the transcowls 300 and a bypass air flow path 212. When in the stowed position, as depicted in FIG. 3, the transcowls 300 are pressed against one or more stow seals, which keep air in the bypass air flow path 212. The transcowls 300 are mechanically linked to a series of blocker doors 304 via a drag link 306. In the stowed position, the blocker doors 304 form a portion of an outer wall and are therefore oriented parallel to the bypass air flow path 212.

However, as is shown in FIG. 4, when the TRAS 112 is commanded to deploy, the transcowls 300 are translated aft, causing the blocker doors 304 to rotate into a deployed position, such that the bypass air flow path 212 is blocked. This also causes the vanes 302 to be exposed and the bypass air flow to be redirected out the vanes 302. The redirection of the bypass air flow in a forward direction creates a reverse thrust and thus works to slow the airplane.

Now referring FIG. 5, which depicts the TRAS 112 in the stowed position, the VAFN system 114 may selectively adjust the nozzles 400 mounted on the trailing edges of the transcowls 300 to optimize the engine performance under different flight conditions. The nozzles 400 may be nozzle-like annular airfoil structures selectively translated (i.e., moved fore and aft) to vary the fan nozzle's exit area and to adjust an amount of engine bypass flow. In some embodiments, the nozzles 400 may also be selectively rotated to adjust the bypass flow. As compared to FIG. 3, the nozzles 400 in FIG. 5 have been translated aft. Any number of nozzles 400 may be provided, although in one exemplary embodiment, two nozzles 400 are provided.

As such, the transcowls 300 and nozzles 400 are selectively translated with one or more actuation systems. In one exemplary embodiment, the nozzles 400 are only operated when the transcowls 300 are in the stowed position. In other words, the nozzles 400 are not operated when the aircraft is landing in this exemplary embodiment. Other embodiments may have different configurations.

Figure 6:
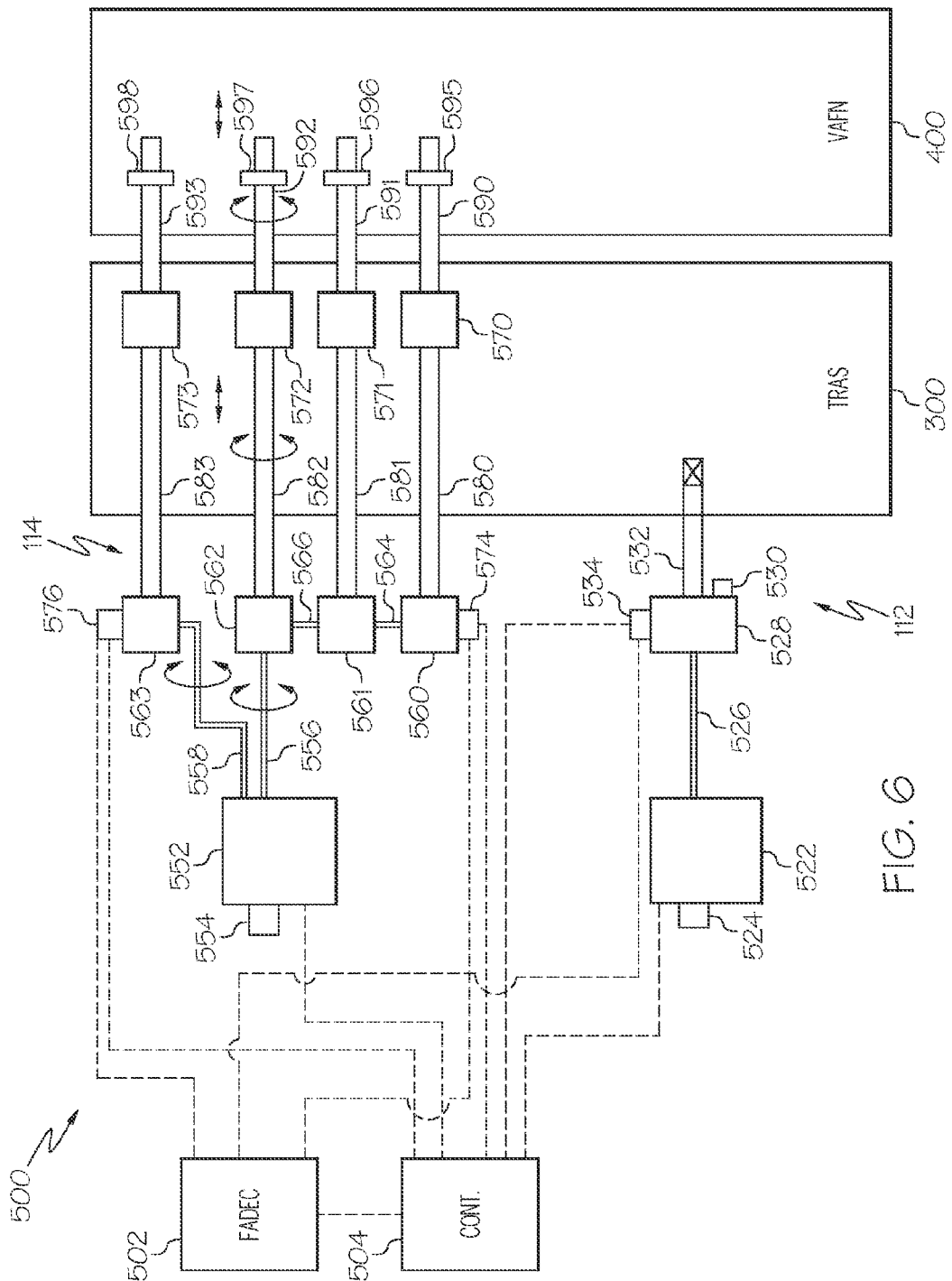
FIG. 6 is a simplified functional schematic representation of an actuation system for a variable area fan nozzle (VAFN) system and thrust reverser actuation system (TRAS) of the engine system of FIG. 2 according to an exemplary embodiment.

FIG. 6 is a simplified functional schematic representation of an actuation system 500 of the case assembly 110 according to an exemplary embodiment. In general, the actuation system 500 modulates the deployment and stowing of the thrust reverser actuation system (TRAS) 112 and the variable area fan nozzle (VAFN) system 114. The actuation system 500 of FIG. 6 is merely one example of an actuation system for the case assembly 110 and other arrangements may be provided. For example, in the depicted exemplary embodiment, the actuation system 500 includes a Full Authority Digital Engine Controller (FADEC) 502 and a low voltage controller 504 that collectively provide power and control to the TRAS 112 and VAFN system 114. In other embodiments, the FADEC 502 and/or controller 504 may be separate for the TRAS 112 and VAFN system 114.

As also described in greater detail below, the TRAS 112 includes a motor 522, a brake (or lock) 524, a drive cable (or flexible shaft) 526, one or more gear boxes 528, a manual drive 530, one or more actuator drives 532, and one or more sensors 534. The VAFN system 114 includes a motor 552, a brake (or lock) 554, one or more drive cables 556, 558, 564, 566, one or more gear boxes 560, 561, 562, 563, one or more actuators 570, 571, 572, 573, one or more sensors 574, 576, and one or more drive couplings 580, 581, 582, 583.

In general, the FADEC 502, which may form part of a broader aircraft control system, provides deploy and stow commands for the TRAS 112 and VAFN system 114 based on signals from a pilot, an aircraft controller, and sensor signals, such as from the sensors 534, 574, 576. In particular, the FADEC 502 provides such commands to the low voltage controller 504. In response, the low voltage controller 504 provides command signals and/or power to the TRAS 112 and/or the VAFN system 114, as described below.

In one exemplary embodiment, the low voltage controller 504 is supplied with power from a 28 VDC power supply, although other power arrangements may be provided. In general, the controller 504 requires relatively low voltages, e.g., less than 110V. The case assembly 110 may additionally receive inputs (e.g., arm and disarm commands) from the aircraft controller.

In general, the motor 522 may be any suitable type of motor to produce a torque. In one exemplary embodiment, the motor 522 is a fuel-driven motor that uses the pressure of the fuel from the fuel system (not shown) or a hydraulic-drive motor that uses the pressure of the fluid from the hydraulic system (not shown). In other embodiments, the motor 522 may be an EM motor powered by a high voltage electrical power source or high power electric controller. The motor 522 may be, for example, about 1-2 hp, less than 10 hp, about 14-16 hp, or about 2-70 hp, although any suitable size may be provided. The brake 524 may be an EM and/or fuel driven energized brake or lock to brake or lock the motor 522. As such, the motor 522 produces mechanical torque that operates the actuator drive 532 via the drive cable 526 and gearbox 528. The drive cable 526 and gearbox 528 are configured to transmit the mechanical torque to the actuator drive 532 in any suitable manner. In one exemplary embodiment the drive cable 526 may be a flexible shaft.

The actuator drive 532 functions to drive the transcowls 300 in stowed and deployed positions in a synchronized manner. As described above in reference to FIGS. 3-5, in a first position, the transcowls 300 are pressed against one or more stow seals, the blocker doors 180 are oriented parallel to the bypass air flow path 160, and the air remains in the bypass air flow path 160. In a second position, the transcowls 300 are translated aft, causing the blocker doors 180 (FIGS. 3-5) to rotate into a deployed position, such that the bypass air flow path 160 is blocked, thereby creating a reverse thrust and slowing the airplane. In some embodiments, intermediate positions may also be provided. Sensor 534 may provide position and status feedback information to the FADEC 502 to determine the appropriate command. Such sensors may be, for example, RVDT, LVDT, and/or resolver assemblies to provide T/R position signals. Although not specifically shown, locks, lock sensors, and other sensors and/or safety components may be provided.

The actuator drive 532 may be a linear actuator that is driven (e.g., retracted and extended between stowed and deployed positions) by the torque from the motor 522. The actuator drive 532 is typically a ballscrew actuator with the translating nut attached to the rotary/linear variable differential transformers attached to the drive cable 526, although other types of actuators may be provided, including electrical, mechanical, pneumatic, hydraulic, or the like, interconnected by appropriate power cables and conduits (not shown). A gimbal or other structure couples the actuator drive 532 to the transcowl 300. Additionally, a manual drive unit 530 mounts to the gearbox 528 and mates with a gearshaft to allow for manual extension and retraction of the transcowl 300.

Now turning to the VAFN system 114, the motor 552 also produces mechanical torque that drives the actuators 570-573 via the drive cables 556, 558, 564, 566, gear boxes 560-563, and drive couplings 580-583. As above, the motor 552 may be any suitable type of motor, including a fuel or hydraulic-driven motor or an EM motor, and the brake 684 may be an EM and/or fuel driven energized brake or lock.

Any suitable arrangement of coupling the motor 552 to the gearboxes 560-563 may be provided. In the exemplary embodiment, drive cables 556, 558 extend from the motor 552 to gearboxes 563, 562, while drive cables 564, 565 couple the gearboxes 560-562 together in series to synchronously transmit the torque. In other embodiments, each of the gearboxes 560-563 may be directly coupled to the motor 552 via independent drive cables or only a single gearbox 560-563 may be coupled to the motor 552 via single drive cable. As noted above, the sensors 574, 576 may be coupled to the gearboxes 560-563 to provide feedback information to the FADEC 502.

As shown, the drive couplings 580-583 respectively couple the gearboxes 560-563 to the actuators 570-573 to transmit the mechanical torque from the motor 552. As above, any suitable arrangement of gearboxes 560-563, actuators 570-573, and drive couplings 580-583 may be provided to operate the nozzles 400. In the depicted embodiment, four sets of individual gearboxes, actuators, and drive couplings are provided, although other embodiments may have any number or combination. In another exemplary embodiment, the gearboxes 560-563 may be eliminated such that individual motors (not shown) drive each actuator 570-573 via drive couplings 580-583.

The actuators 570-573 function to drive the nozzles 400 in stowed and deployed positions in a synchronized manner. As described above in reference to FIGS. 3-5, the effective flow area may be adjusted by moving the nozzle position from 0% to 100% of stroke. Although not specifically shown, sensors, locks, lock sensors, manual drive units, and other components may be provided.

The actuators 570-573 are typically ballscrew actuators with a translating nut coupled to the drive couplings 580-583, although other types of actuators may be provided, including electrical, mechanical, pneumatic, hydraulic, or the like, interconnected by appropriate power cables and conduits (not shown). In one exemplary embodiment, the actuators 570-573 respectively include ballscrew drive shafts 590-593 extended to a gimbal or other structure 595-598 that attach the actuators 570-573 to the nozzles 400. As such, the actuators 570-573 receive the mechanical torque from the gearboxes 560-563, which results in the rotation of the ballscrew drive shafts 590-593. As the threaded, helical raceways of the ballscrew drive shafts 590-593 rotate, the rotational motion is translated into linear motion such that the nozzles 400 are extended or retracted, depending on the direction of rotation, e.g., rotating the drive shafts 590-593 in a first direction extends the nozzles 400 and rotating the drive shafts 590-593 in a second direction retracts the nozzles 400.

As described in greater detail below, the drive couplings 580-583 are arranged to transmit the mechanical torque while enabling linear displacement of the actuators 570-573 on the transcowls 300 relative to the gearboxes 560-563. For example, the drive couplings 580-583 may be translating drive couplings.

Figure 7:
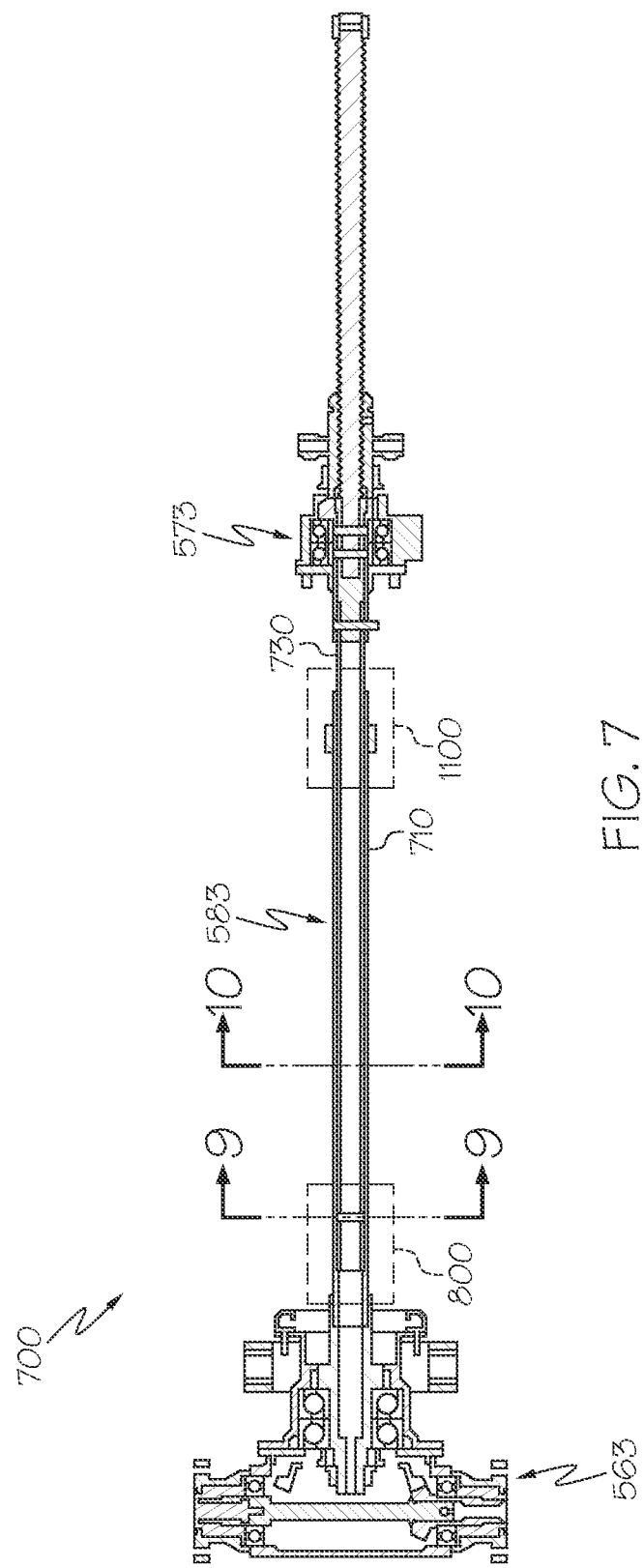
FIG. 7 is a cross-sectional view of a VAFN drive assembly of the VAFN system of FIG. 6 according to an exemplary embodiment.
Figure 8:
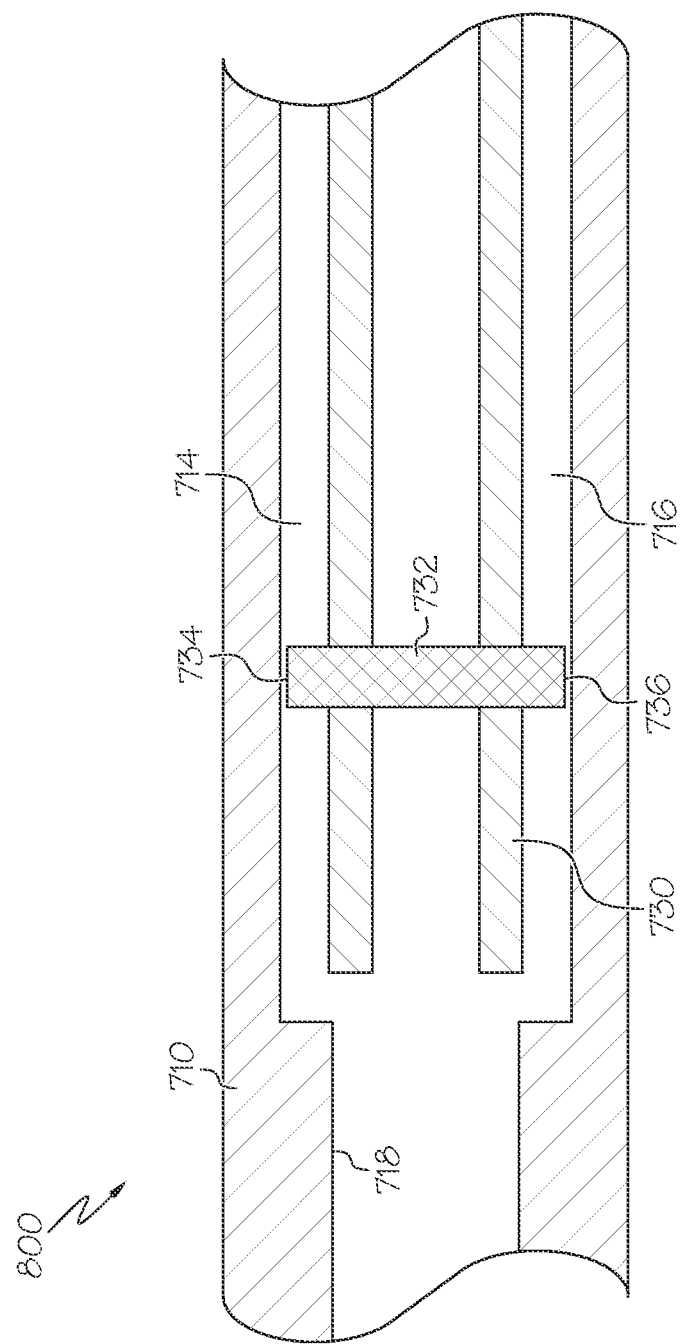
FIG. 8 is a first more detailed cross-sectional view of the VAFN drive assembly of FIG. 7 according to an exemplary embodiment.

FIG. 7 is a cross-sectional view of a VAFN drive assembly 700 of the VAFN system 114 of FIG. 6 according to an exemplary embodiment. FIG. 8 is a first more detailed cross-sectional view of the VAFN drive assembly 700 of FIG. 7 according to an exemplary embodiment. FIGS. 9 and 10 are cross-sectional views of the VAFN drive assembly 700 through line 9-9 and line 10-10, respectively, of FIG. 7 according to an exemplary embodiment. FIG. 11 is a second more detailed cross-sectional view of the VAFN drive assembly 700 of FIG. 7 according to an exemplary embodiment.

Collectively, the VAFN drive assembly 700 may refer to any portion of the VAFN system 114 that translates the nozzles 400, e.g., the gearboxes, drive couplings, and actuators introduced above. FIG. 7-9 depict one set or combination of gearbox 563, drive coupling 583, and actuator 573 discussed above with reference to FIG. 6. Although the gearbox 563, the drive coupling 583, and the actuator 573 are referenced below, the discussion is applicable to any of the gearboxes 560-563, drive couplings 580-583, and actuators 570-573 discussed above.

Referring initially to FIG. 7, the gearbox 563 is generally described above. In particular, the gearbox 563 is configured to mechanically couple the drive cable 558 (FIG. 6) to the drive coupling 583 to suitably transmit the torque.

The drive coupling 583 includes an external or first tube (or sleeve) 710 coupled to the gearbox 563. The external tube 710 may be, for example, welded to an output of the gearbox 563 such that the gearbox 563 is configured to transmit torque to the external tube 710. As noted above, in some embodiments, the gearbox 563 may be omitted such that the drive coupling 583 is directly coupled to a motor, e.g. motor 552.

The drive coupling 583 further includes an internal or second tube (or shaft) 730 coupled to the actuator 573. The internal tube 730 may be coupled to the actuator 573 in any suitable manner, including a screw and nut mounting arrangement, brackets, and/or welding. In one exemplary embodiment, the tubes 710, 730 are stainless steel tubes. As described in greater detail below, the internal tube 730 is configured to be rotatably driven by the external tube 710 such that the internal tube 730 rotates with the external tube 710, and the internal tube 730 is configured to slide or axially translate within the external tube 710 such that the tubes 710, 730 maintain rotational engagement while accommodating linear displacement. As described above, the actuator 573 includes a drive component 593 that, when rotated, extends and retracts the nozzles 400.

As noted above and additionally referring to FIGS. 2-6, during operation, the TRAS 112 is configured to deploy and retract the transcowls 300. The actuators 570-573 of the VAFN system 114 are mounted on the transcowls 300, while the gearboxes 560-563 are mounted on the engine case or frame (e.g., a fixed torque box) and are generally stationary. As such, the actuators 570-573 move relative to the gearboxes 560-563 as the transcowls 300 are retracted and extended between the stowed and deployed positions. As a result of this arrangement, the drive couplings 580-583 are configured to support translational movement (e.g. along the longitudinal axis of the tubes 710, 730) to accommodate the relative movement of the gearboxes 560-563 and actuators 570-573 and rotational movement (e.g., about the longitudinal axis of the tubes 710, 730) to transmit mechanical torque between the gearboxes 560-563 and actuators 570-573, as will now be described.

As such, returning to FIG. 7, the internal tube 730 extends at least partially within the external tube 710. The arrangement of the internal tube 730 and the external tube 710 may be considered a translating arrangement in that the outer diameter of the internal tube 730 is less than the inner diameter of the external tube 710. As a result of the relative sizes, the internal tube 730 and external tube 710 may translate relative to one another, e.g., the internal tube 730 may slide along the longitudinal axis within the external tube 710. Although the depicted embodiment shows the internal tube 730 mounted to the actuator 573 and the external tube 710 mounted to the gearbox 563, in other embodiments, the tubes 710, 730 may be reversed such that the external tube 710 is mounted on the actuator 573 and the internal tube 730 is mounted on the gearbox 563.

Reference is now additionally made to FIGS. 8-10. As noted above, FIG. 8 is a more detailed partial cross-sectional sectional view of a portion of FIG. 7, generally corresponding to box 800. FIG. 8 particularly depicts a portion of the external tube 710 and the internal tube 730. As shown, the external tube 710 includes internal, radial slots 714, 716 formed within an interior surface 718 of the external tube 710. Generally, two slots 714, 716 are provided and are oriented opposite one another (e.g., 180° apart). In one exemplary embodiment, except for the slots 714, 716, the interior surface 718 of the external tube 710 may be uninterrupted about the circumference, along the length to result in a generally smooth curved interior surface 718.

The slots 714, 716 are more clearly shown in FIGS. 9 and 10, which are cross-sectional views through line 9-9 and line 10-10 of FIG. 7, respectively. As above, FIGS. 9 and 10 particularly depict a portion of the external tube 710, the internal tube 730, and internal slots 714, 716 formed within the interior surface 718 of the external tube 710.

Referring again to FIGS. 8 and 9, the internal tube 730 includes a pin 732 extending through the center or diameter of the internal tube 730. The pin 732 includes first and second ends 734, 736 that extend beyond the outer circumferential surface of the internal tube 730. In particular, the pin 732 is sized such that the first end 734 slides within the first slot 714 and the second end 736 slides within the second slot 716. In other words, the length of the pin 732 is less than the distance between the bases of the slots 714, 716 but greater than the inner diameter (e.g., at surface 718) of the external tube 710. In general, the pin 732 is relatively small and only has two ends, although other arrangements may be provided. In one exemplary embodiment, only one pin 732 is provided, although additional pins may be added. In one exemplary embodiment, the pin 732 is generally cylindrical with a circular cross-sectional area in a plane perpendicular to the pin length, although other shapes and arrangements may be provided.

As a result of the arrangement of the slots 714, 716 and pin 732, external tube 710 retains internal tube 730 in a circumferential or rotational direction, while enabling translation or longitudinal movement of the external and internal tubes 710, 730. As such, the external tube 710 is configured to transmit mechanical torque on the internal tube 730 via the walls of the slots 714, 716 and the pin 732. The tubes 710, 730 maintain the rotational coupling through the extent of the movement of the actuator 573. In other words, even when the transcowls 300 (FIGS. 2-6) are deployed at 100% of stroke, at least a portion of the internal tube 730 is positioned within the external tube 710.

During installation, the internal tube 730 may be inserted into an open end 712 of the external tube 710, as described in greater detail below. In one exemplary embodiment, the slots 714, 716 extend from the open end 712 through a majority of the length of the external tube 710 or at least along a length corresponding to an anticipated distance of travel of the internal tube 730, which generally corresponds to the extent of displacement of the transcowl 300 (e.g., the distance between retraction and deployment).

In one exemplary embodiment, the pin 732 extends completely through internal tube 730. For example, the pin 732 may be press fit into the internal tube 730. In other embodiments, the pin 732 may be formed by two separated portions, e.g., extending from the outer surface of the internal tube 730 into the slots 714, 716.

Reference is now additionally made to FIG. 11. As noted above, FIG. 11 is a more detailed partial cross-sectional sectional view of a portion of FIG. 7, generally corresponding to box 1100. FIG. 11 particularly depicts a portion of the external tube 710 and the internal tube 730 at the end of the external tube 710. As also noted above, the slots 714, 716 extend from the end 712 of the external tube 710 such that the internal tube 730 may be inserted, with the pin 732, into the external tube 710 during installation.

FIG. 11 additionally depicts a scraper seal 750 mounted between the internal tube 730 and the external tube 710 at the end 712 of the external tube 710. The scraper seal 750 functions to prevent and/or mitigate dirt, water, and/or other debris from entering the external tube 710 as the internal tube 730 translates, thus maintaining a more durable and robust coupling. In one exemplary embodiment, the scraper seal 750 may be annular and mounted in a seal seat 720 formed in the external tube 710 with a diameter sufficient to press against the outer surface of the internal tube 730. The seal seat 720 may be, for example, a machined annulus at the end 712 of the external tube 710. The scraper seal 750 may be, for example, a rubber or thermoplastic seal. In one exemplary embodiment, the scraper seal 750 may have slots corresponding to slots 714, 716 to accommodate the pin 732 during installation, while in another exemplary embodiment, the scraper seal 750 may be a split seal installed after the internal tube 730 is inserted into the external tube 710 or the scraper seal 750 may be installed after insertion of the internal tube 730 and held in place by a nut threading onto threads machined on the outer diameter of the external tube 710. In a further exemplary embodiment, the scraper seal 750 may be deformable and resilient such that the pin 732 may be inserted through or across the scraper seal 750. In a further exemplary embodiment, the seal may include an outer diameter with an integral steel sleeve that press-fits into the annulus of the external tube 710. In general, any seal arrangement may be provided to prevent or mitigate contamination, including non-scraper seals.

FIG. 11 additionally depicts a bushing or bearing 760 that supports the drive coupling 583 at the external tube 710. Any suitable bearing 760 may be provided that enables rotational support of the external tube 710, either directly or through a welded or pressed-on sleeve. In one exemplary embodiment, the bearing 760 is a pillow block bearing.

Accordingly, an improved drive coupling between the gearbox and actuator of the VAFN system is provided. The drive coupling provides a relatively simple and light-weight arrangement for rotatably coupling the VAFN system, while allowing translational movement. The drive coupling further provides a seal to prevent and/or mitigate debris contamination during translation. In particular, the drive coupling with a single pin with two extended ends that couple to two corresponding slots provides a low cost, light weight solution.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A variable area fan nozzle (VAFN) system for a fan case of an engine, comprising:
  a motor configured to provide mechanical torque;
  a gearbox coupled to the motor to receive the mechanical torque from the motor;
  an actuator coupled to the gearbox to receive the mechanical torque from the gearbox;
  a nozzle coupled to the actuator and configured to be driven based on the mechanical torque;
  a drive coupling extending between the gearbox and the actuator and configured to transmit the mechanical torque from the motor to the actuator, the drive coupling comprising
    an external tube extending from a first one of the gearbox or the actuator, the external tube defining first and second slots extending in a longitudinal direction, and
    an internal tube extending from a second one of the gearbox or the actuator and at least partially extending within the external tube, the internal tube including a pin with first and second ends respectively positioned within the first and second slots such that the internal tube is configured to translate within the external tube and to be rotatably coupled to the external tube; and
a seal arrangement engaging the internal tube.

2. The VAFN system of claim 1, wherein the first and second slots are formed within an interior circumferential surface of the external tube.

3. The VAFN system of claim 2, wherein the first slot is positioned 180° apart from the second slot.

4. The VAFN system of claim 2, wherein the interior circumferential surface of the external tube is an uninterrupted curved surface between the first slot and the second slot.

5. The VAFN system of claim 1, wherein the pin is cylindrical.

6. The VAFN system of claim 1, wherein the external tube has a first end through which the internal tube extends, and wherein the seal arrangement is mounted on the first end of the external tube.

7. The VAFN system of claim 6, wherein seal arrangement is an annular scraper seal.

8. The VAFN system of claim 1, wherein the external tube extends from the gearbox and the internal tube extends from the actuator.

9. A drive coupling extending between a gearbox and actuator of an aircraft variable area fan nozzle (VAFN) system, the drive coupling comprising:
an external tube extending from the gearbox, the external tube defining first and second slots extending in a longitudinal direction; and
an internal tube extending from the actuator and at least partially extending within the external tube, the internal tube including a pin with first and second ends respectively positioned within the first and second slots such that the internal tube is configured to translate within the external tube and to be rotatably coupled to the external tube, wherein the pin is cylindrical.

10. The drive coupling of claim 9, wherein the first and second slots are formed within an interior circumferential surface of the external tube, and wherein the first slot is positioned 180° apart from the second slot.

11. The drive coupling of claim 9, wherein the interior circumferential surface of the external tube is an uninterrupted curved surface between the first slot and the second slot.

12. The drive coupling of claim 9, wherein the external tube has a first end through which the internal tube extends, and wherein the drive coupling further comprises a seal arrangement mounted on the first end of the external tube and engaging the internal tube.

13. A case assembly for an aircraft, comprising:
an engine system;
an inner cowl circumscribing the engine system to form a core flow path;
a fan case circumscribing the inner cowl to form a bypass flow path;
a thrust reverser actuation system (TRAS) comprising a transcowl with a stowed position and a deployed position, the transcowl selectively blocking a portion of bypass flow path in the deployed position; and
a variable area fan nozzle (VAFN) system comprising:
a motor configured to provide mechanical torque;
an actuator coupled to the motor to receive the mechanical torque from the motor, wherein the actuator is mounted on the transcowl;
a nozzle coupled to the actuator and configured to be driven based on the mechanical torque to selectively restrict the bypass flow path; and
a drive coupling configured to transmit the mechanical torque from the motor to the actuator, the drive coupling comprising
an external tube coupled to a first one of the motor or the actuator, the external tube defining first and second slots extending in a longitudinal direction, and
an internal tube coupled to a second one of the motor or the actuator and at least partially extending within the external tube, the internal tube including a pin with first and second ends respectively positioned within the first and second slots such that the internal tube is configured to translate within the external tube and to be rotatably coupled to the external tube.

14. The case assembly of claim 13, wherein the first and second slots are formed within an interior circumferential surface of the external tube.

15. The case assembly of claim 14, wherein the first slot is positioned 180° apart from the second slot.

16. The case assembly of claim 14, wherein the interior circumferential surface of the external tube is an uninterrupted curved surface between the first slot and the second slot.

17. The case assembly of claim 13, further comprising a seal arrangement engaging the internal tube.

18. The case assembly of claim 17, wherein the external tube has a first end through which the internal tube extends, and wherein the seal arrangement is mounted on the first end of the external tube.

* * * * *